Oct. 7, 1958     J. R. COBB, JR     2,855,433
RECOVERY OF OLEFIN HYDROCARBONS
Filed May 13, 1955
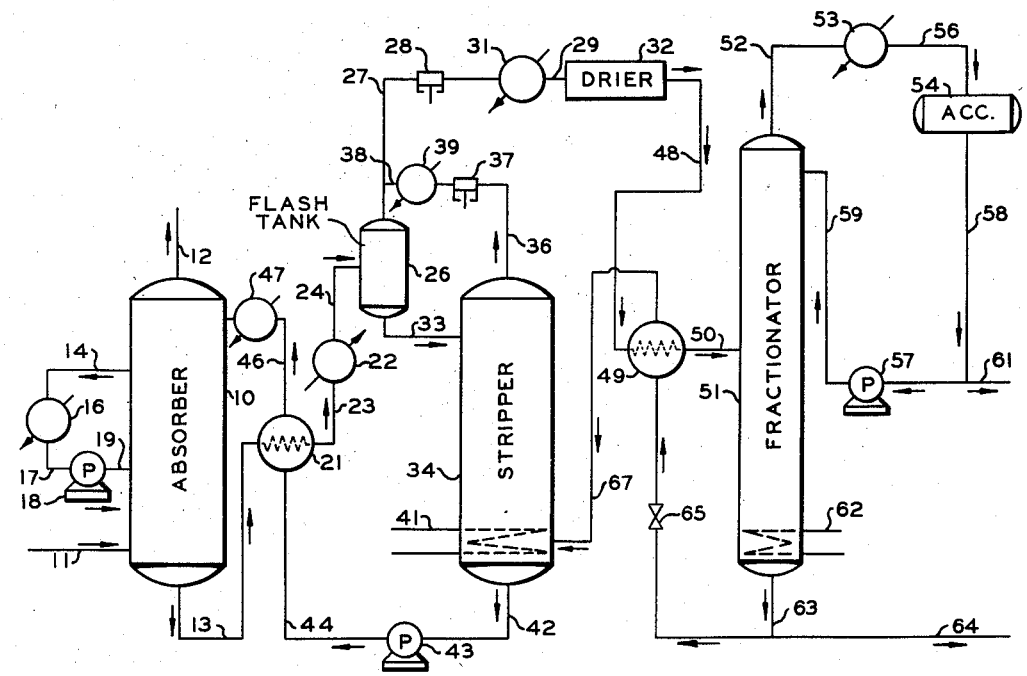
INVENTOR.
J. R. COBB, JR.
BY
*Hudson and Young*
ATTORNEY United States Patent Office 2,855,433
Patented Oct. 7, 1958

2,855,433
RECOVERY OF OLEFIN HYDROCARBONS

Joseph R. Cobb, Jr., Bartlesville, Okla., assignor to Phillips Petroleum Company, a corporation of Delaware Application May 13, 1955, Serial No. 508,107

5 Claims. (Cl. 260—677)

This invention relates to the separation of olefinic hydrocarbons from mixtures containing olefinic hydrocarbons and saturated hydrocarbons. In a further aspect, this invention relates to an improved process for recovering olefins from gaseous mixtures containing the same by means of a solvent which forms an addition compound therewith, the improvement comprising a process wherein decomposition of the selective solvent is minimized.

It has long been known that olefins react with cuprous salts in aqueous or nonaqueous media to yield easily decomposable addition products, while paraffinic hydrocarbons do not. This reactivity of olefins with cuprous salts has been applied to the separation of olefins from paraffins. Because of the very low solubility of most cuprous salts in water, various aqueous and nonaqueous solvents have been utilized to dissolve the cuprous salts. Known processes using aqueous media have employed hydrochloric acid or ammonia to bring appreciable amounts of the cuprous salts into solution. Furthermore, organic nitrogen bases or phenols have been employed as agents to increase the solubility of the cuprous salts.

My invention is generally applicable to any of these solutions for the separation of olefins from paraffins. One which I have especially found suitable for commercial operation is cuprous nitrate in monoethanolamine and, for convenience, the balance of the specification is specifically directed thereto although, broadly, the invention is applicable to the entire class of solvents.

One of the principal problems in the use of these solutions is the relatively low decomposition temperature of the solution. For instance, when using cuprous nitrate in monoethanolamine, decomposition becomes appreciable at 140° F. and at 176° F. the solution is considered much too unstable for commercial operation.

One of the characteristics of these solutions is that ethylene, in spite of its high volatility, is tightly bound by the cuprous salt. Of the olefins, ethylene is the most firmly bound, propylene is less firmly bound, and butylene is still less firmly bound. In fact, propylene has a volatility relative to ethylene of about 4:1 to about 10:1 out of a solution of cuprous nitrate in monoethanolamine in spite of the fact that normally ethylene is considered more volatile than propylene. Because of this fact, propylene can be easily removed from solution by heating at atmospheric pressure but ethylene cannot be removed in this way without exceeding the temperature at which decomposition of the solvent medium begins.

Prior operation using such solvents has involved operation of the stripper at a vacuum in order to recover ethylene from the solution without exceeding the temperature limit of the solvent. Obviously, vacuum operation involves many disadvantages. The investment required for the stripper and in the compression of the overhead gases to the pressure suitable for fractionation of the stripped gases is increased. In addition, the use of a vacuum introduces problems of air leakage into the system with resulting oxygen contamination of the ethylene product.

The following are objects of this invention.

An object of this invention is to provide an improved process for the recovery of olefins from mixtures containing the same. A further object of this invention is to provide an improved process for the recovery of ethylene from an ethylene containing gas wherein a solvent or absorbent which forms an addition compound with ethylene is used. A further object of this invention is to provide a process for the recovery of ethylene wherein decomposition of a cuprous absorbent solution is minimized by avoiding excessive temperatures in the stripping of the ethylene from the absorbent solution. A further object of this invention is to reduce the investment involved in recovering ethylene from an ethylene containing gas by eliminating the need for vacuum operation in the process.

Other objects and advantages of this invention will be apparent to one skilled in the art upon reading this invention and studying the drawing which accompanies, and forms a part of, this specification.

The drawing comprises a diagrammatic illustration of apparatus suitable for the practice of the present invention.

I have found that the disadvantages set forth above in connection with olefin separation using cuprous salt solutions can be eliminated by the use of subsequently obtained fractionator bottoms as the stripping gas in the absorbent stripper. More specifically, in the recovery of ethylene, the fractionator bottoms, consisting essentially of propylene, are used as this stripping gas. In this manner, I make use of the high volatility of propylene relative to ethylene in the cuprous solution to strip efficiently ethylene from the solution at safe temperatures and without vacuum.

In the accompanying drawing, the absorber 10 is provided with feed conduit 11, overhead conduit 12, and bottoms conduit 13. For heat control, a removal conduit 14 is provided, this conduit communicating with heat exchanger 16. Conduit 17 connects heat exchanger 16 and pump 18 and the outlet of pump 18 is connected with absorber 10 by means of conduit 19. Conduit 13 is connected to heat exchanger 21 being connected to heater 22 by means of conduit 23. Conduit 24 connects the outlet of heat exchanger 22 with flash zone 26. An overhead product conduit 27 connects the upper end portion of flash zone 26 with compressor 28 and conduit 29, having cooler 31 therein, communicates with drier 32. Extending from the lower end portion of flash zone 26 is conduit 33, this conduit communicating with the upper end portion of stripper 34. Extending from the upper portion of stripper 34 is conduit 36, this conduit extending to compressor 37. Conduit 38, having cooler 39 therein, communicates with conduit 27 extending from the upper end portion of flash zone 26. Stripper 34 is provided with a reboiler 41. Extending from the lower end portion of stripper 34, there is provided conduit 42 which communicates with pump 43. Conduit 44 extends from the outlet of pump 43 to indirect heat exchanger 21. Conduit 46, having cooler 47 therein communicates with the upper end portion of absorber 10. Conduit 48 is provided connecting drier 32 with heat exchanger 49, which in turn is connected to fractionator 51 by conduit 50. Fractionator 51 is provided with overhead removal conduit 52 which communicates with condenser 53 which in turn is in communication with accumulator 54 by means of conduit 56. Reflux return pump 57 is supplied from accumulator 54 by means of conduit 58, reflux liquid being supplied to the upper portion of fractionator 51 by means of conduit 59. Conduit 61, which serves as a product outlet, extends from conduit 58.

Reboiler 62 is provided in the lower portion of fractionator 51. Conduit 63, having expansion valve 65 therein extends from the kettle of fractionator 51 to heat exchanger 49 and conduit 67 extends from heat exchanger 49 to the lower portion of stripper 34. Conduit 64 is provided as a product removal conduit, this conduit 64 being in communication with conduit 63.

In the operation of this process a feed gas, a cracked or refinery gas, which has previously been deoiled, dried and deacetylized, comprises principally hydrogen, methane, ethane, ethylene, propane, and propylene, as well as minor amounts of other components. This gas is fed to the absorber where it is contacted, preferably countercurrently, with the cuprous nitrate-monoethanolamine-water solution. The absorber is equipped with vapor-liquid contacting devices of any suitable type. While exact operating conditions in such an absorber are easily determined by one skilled in the art, I prefer to operate the absorber at a temperature of about 50° F. to about 70° F. and at a pressure of 100 to 200 p. s. i. a., the lower pressure being when the feed is a cracked gas of high ethylene content and the higher pressure being used when the feed is a residue gas of low ethylene content. Olefins are absorbed from the gas by the solvent, the unabsorbed materials leaving the top of the absorber. Rich absorbent solution is heat exchanged with lean absorbent recovered from the stripper in a heat exchanger, and heated to a temperature of 120 to 140° F. and fed to a flash zone. The bottoms from the flash zone are introduced into the stripper.

I prefer to operate the stripper at atmospheric pressure or slightly higher and at a temperature range of 120 to 140° F. The stripper is provided with means for introducing heat to the bottom and with suitable vapor-liquid contacting devices. By-product propylene produced in the process, as explained below, is introduced at the base of the stripper as a stripping gas. The stripper overhead, following compression and cooling is combined with the flash zone overhead and this mixture of ethylene, propylene, and traces of heavier olefins is compressed to 200 to 350 p. s. i., dried, cooled, and fed to the ethylene fractionator. This column is equipped with suitable vapor-liquid contacting devices, suitable external or internal reboiling means and an overhead condenser, accumulator, and means for introducing reflux at the top. I prefer to operate with a top temperature of −20 to −60° F., the latter temperature corresponding to the lower pressure mentioned above. Ethylene is withdrawn from the accumulator as the product of the process. Propylene, with traces of heavier olefins, is withdrawn from the base of the column as the by-product. A portion of the propylene is passed to the stripper as the stripper gas.

In order that my invention may be fully understood by one skilled in the art, the following example is provided. It will be understood that the specific physical conditions set forther therein may be varied depending upon the composition of the feed stream, the desired purity in the product and other factors, the example being provided to illustrate the invention and not to limit the invention unduly.

As stated previously, cuprous nitrate in aqueous monoethanolamine is preferred as the absorbent, the amount of copper ranging from 50 to 250 grams per liter. The analysis of such a typical preferred solvent is

|  | gms./liter | mols/liter |
| --- | --- | --- |
| Cuprous copper | 130 | 2.0 |
| Cupric copper | 10 | 0.2 |
| Nitrate ion | 200 | 3.2 |
| Monoethanolamine | 345 | 5.6 |
| Ammonia | 20 | 1.2 |
| Water | 530 | 29.4 |
| Total | 1,235 | 41.6 |

Such an absorbent can be made by reacting a mixture of copper and cupric oxide with a water solution of ammonium nitrate and monoethanolamine, at a temperature of approximately 150° F. Of course, the relative amount of the monoethanolamine and water can be varied. Satisfactory operation is obtained when about 1.3 mols of cuprous copper is used per mol of olefin absorbed. Therefore, approximately 27 mols of the above-identified solution is used per mol of olefin absorbed.

In this example the description is given in general terms of temperatures and pressures, and to simplify the discussion, a material balance of the various streams is set forth following the general discussion. In this operation, the feed stream at a pressure of approximately 125 p. s. i. a. and a temperature of 65° F. is introduced into absorber 10 through conduit 11. The temperature in the absorber is controlled by means of removal of a side stream, adjustment of the temperature thereof, and reintroduction of this stream into the column. The overhead gas containing the saturated componentts, the material not absorbed by the absorbent solution, is removed through conduit 12. Absorber 10 is supplied with the absorbent solution as hereinafter pointed out. The olefin-absorbent complex is removed from the absorber through conduit 13, heat exchanged with the absorbent in indirect heat exchanger 21, heated to approximately 130° F. in heater 22 and flashed in flash zone 26, this zone being operated at about 60 p. s. i. a. compared to a pressure of approximately 120 p. s. i. a. in the absorber. The absorbent-olefin complex is then introduced into stripper 34 through conduit 33, this stripper operating at 18 to 19 p. s. i. a. and a temperature of approximately 130° F. This stripper is supplied with propylene as the desorbent gas from conduit 63, this propylene being obtained as hereinafter described.

The olefins stripped from the absorbent are removed from the upper end portion of the stripper through conduit 36, compressed, cooled, and mixed with the overhead from the flash zone in conduit 27. The stripped absorbent is returned to the absorber column from the lower portion of stripper 34 by means of pump 43 after having its temperature reduced to approximately 43° F. by means of heat exchange with the absorber bottoms and such further cooling as is necessary in cooler 47. The combined olefin stream is then further compressed to approximately 220 p. s. i. a., cooled, dried in drier 32, and introduced by means of conduit 48, heat exchanger 49, and conduit 50 into fractionator 51. This fractionator is operated as a conventional ethylene-propylene fractionator and is provided with a condenser 53 and accumulator 54 which supply reflux liquid to fractionator 51 through conduits 58 and 59. Reboiler 62 serves to maintain a temperature of approximately 94° F. in the lower portion of this column, the pressure being approximately 200 p. s. i. a. The ethylene product is recovered from the accumulator 54, conduit 58, and conduit 61.

Propylene, recovered from the bottom of fractionator 51 is a second product of this system and a portion of this propylene is returned by conduit 63, heat exchanger 49, and conduit 67 to the lower end portion of stripper 34, this propylene serving to strip olefins from the absorbent in the stripper. The propylene is at least partially vaporized and thereby cooled in passing through expansion valve 65, this providing cooling of the feed to fractionator 51. Preferably, the cooling in cooler 31 is adjusted so that the propylene stream is completely vaporized before entry into stripper 34.

The following is a material balance for the system above described, the components being given in mols per unit time. This material balance is given on an absorbent-free basis, it being obvious that the absorbent would be present in the absorber bottoms, the flash zone bottoms and the stripper bottoms.

| Component | Feed | Absorber Overhead | Absorber Bottoms | Flash Zone Overhead | Flash Zone Bottoms | Stripper Overhead | Stripper Bottoms | Fractionator Feed | Fractionator Overhead | Fractionator Bottoms | Stripping Gas |
|---|---|---|---|---|---|---|---|---|---|---|---|
| $H_2$ | 42 | 42 | | | | | | | | | |
| $CH_4$ | 176 | 175.5 | 0.5 | 0.5 | | | | 0.5 | 0.5 | | |
| $C_2H_4$ | 134 | 3 | 137 | 73 | 64 | 58.2 | 6 | 131.2 | 130.7 | 0.3 | 0.2 |
| $C_2H_6$ | 31 | 31 | | | | | | | | | |
| $C_3H_6$ | 48 | 24 | 27 | 16 | 11 | 24 | 3 | 40 | 0.4 | 23.6 | 16 |
| $C_3H_8$ and higher | 3 | 2.5 | 0.5 | 0.5 | | 0.3 | | 0.8 | | 0.5 | 0.3 |

As many possible embodiments may be made of this invention without departing from the scope thereof, it is to be understood that all matter herein set forth is to be interpreted as illustrative and not as unduly limiting the invention.

I claim:

1. The method of separating and recovering an olefin from a feed containing said olefin, a higher olefin, and paraffins, the components of said feed comprising a closely boiling mixture comprising contacting said feed in an absorption zone with a selective solvent whereby an easily decomposable olefin-absorbent addition compound is formed, removing non-absorbed components of said feed from said absorption zone, removing said addition compound from said absorption zone and introducing same into a stripping zone operated at approximately atmospheric pressure and below the decomposition temperature of said absorbent, said stripping zone being supplied with a stripping gas comprising an olefin higher than said desired olefin supplied as hereinafter described, removing stripped absorbent from said stripping zone, removing stripped olefins from said stripping zone, and introducing said stripped olefins into a fractionation zone, removing said desired olefin as an overhead product of said fractionation zone, removing said higher olefin as a kettle product of said fractionation zone, and introducing at least a portion of said higher olefin into said stripping zone.

2. A method of separating and recovering ethylene from a feed stream containing ethylene, propylene, and $C_3$ and lighter paraffins, comprising contacting said feed stream in an absorption zone with an aqueous solution of cuprous nitrate in monoethanolamine whereby an olefin-absorbent addition compound is formed, removing non-absorbed components of said feed from said absorption zone, removing said addition compound from said absorption zone and introducing same into a stripping zone operated at approximately atmospheric pressure and below 140° F., said stripping zone being supplied with a propylene stripping gas as hereinafter described, removing stripped absorbent from said stripping zone, removing stripped olefins from said stripping zone, and introducing said stripped olefins into a fractionation zone, removing ethylene as an overhead product of said fractionation zone, removing propylene as a kettle product of said fractionation zone, and introducing at least a portion of said propylene into the stripping zone.

3. A method of separating and recovering ethylene from a feed stream containing ethylene, propylene, $C_3$ and lighter paraffins, and hydrogen, comprising contacting said feed stream in an absorption zone with a selective absorbent comprising an aqueous solution of cuprous nitrate in monoethanolamine, whereby an olefin-absorbent compound is formed, removing non-absorbed components of said feed from said absorption zone, removing addition compounds from said absorption zone and introducing same into a stripping zone operated at approximately atmospheric pressure and below 140° F., said stripping zone being supplied with a propylene stripping gas as hereinafter described, removing stripped absorbent from said stripping zone, passing said stripped absorbent in heat exchange relationship with the addition compound removed from said absorption zone and into said absorption zone, removing stripped olefins from said stripping zone, introducing said stripped olefins into a fractionation zone, removing ethylene as an overhead product of said fractionation zone, removing propylene as a kettle product of said fractionation zone, passing at least a portion of said propylene in heat exchange relationship with olefins removed from said stripping zone thereby vaporizing said propylene, and introducing said vaporized propylene into said stripping zone.

4. A method of separating and recovering ethylene from a feed stream containing ethylene, propylene, $C_3$ and lighter paraffins, and hydrogen, comprising contacting said feed stream in an absorption zone with a selective absorbent comprosing cuprous nitrate in monoethanolamine whereby an olefin-absorbent addition compound is formed, said absorbent zone being maintained at a temperature of about 50° F. to about 70° F. and a pressure of 100 to 200 p. s. i. a., removing non-absorbed components of said feed from said absorption zone, removing said addition compound from said absorption zone and introducing same into a stripping zone operated at approximately atmospheric pressure and at 120 to 140° F., said stripping zone being supplied with a propylene stripping gas as hereinafter described, removing stripped absorbent from said stripping zone, passing said stripped absorbent in heat exchange relationship with the addition compound removed from said absorption zone and into said absorption zone, removing stripped olefins from said stripping zone, drying same, and introducing said stripped olefins into a fractionation zone operated with top temperature of —20 to —60° F. and a pressure of 200 to 350 p. s. i., removing ethylene as an overhead product of said fractionation zone, removing propylene as a kettle product of said fractionation zone, passing at least a portion of said propylene in heat exchange relationship with the olefins removed from said stripping zone thereby vaporizing said propylene, and introducing said vaporized propylene into the stripping zone.

5. The method of separating and recovering an olefin from a feed containing said olefin, a higher olefin, and paraffins, the components of said feed comprising a closely boiling mixture, comprising contacting said feed with a thermally unstable cuprous salt selective solvent whereby an easily decomposable olefin-absorbent addition compound is formed, removing non-absorbed components of said feed from said absorber zone, removing said addition compound from said absorption zone and introducing same into a stripping zone operated at approximately atmospheric pressure and below the decomposition temperature of said absorbent, said stripping zone being operated with a stripping gas comprising an olefin higher than the desired olefin supplied as hereinafter described, removing stripped absorbent from said stripping zone, removing stripped olefins from said stripping zone, and introducing said stripped olefins into a fractionation zone, removing the desired olefin as an overhead product of said fractionation zone, removing said higher olefin as a kettle product of said fractionation zone, and introducing at least a portion of said higher olefin into said stripping zone, the amount of said higher olefin introduced into said stripping zone being sufficient to maintain the temperature in said stripping zone below the decomposition temperature of said absorbent.

References Cited in the file of this patent

UNITED STATES PATENTS

| | | |
|---|---|---|
| 1,741,559 | Dawson | Dec. 31, 1929 |
| 1,977,659 | Watts | Oct. 23, 1934 |
| 2,005,500 | Joshua et al. | June 18, 1935 |
| 2,369,559 | Gilliland | Feb. 13, 1945 |
| 2,443,245 | Hibshman | June 15, 1948 |
| 2,523,681 | Cole | Sept. 26, 1950 |
| 2,561,822 | Savoy | July 24, 1951 |